United States Patent [19]

Rittenhouse

[11] Patent Number: 4,586,257
[45] Date of Patent: May 6, 1986

[54] RELEASABLE BLADE, BLADE HOLDER AND BLADE-HOLDER COMBINATION

[76] Inventor: James L. Rittenhouse, 5115 Benner Rd., Clayton, Mich. 49235

[21] Appl. No.: 589,143

[22] Filed: Mar. 13, 1984

[51] Int. Cl.⁴ ............................................. B26B 7/00
[52] U.S. Cl. ...................................... 30/276; 30/339; 30/347; 403/260; 403/353
[58] Field of Search ................. 30/162, 264, 265, 276, 30/347, 337, 339, DIG. 5; 56/17.5, 295; 403/260, 353

[56] References Cited

U.S. PATENT DOCUMENTS

| | | | |
|---|---|---|---|
| 2,215,125 | 9/1940 | Maltz | 30/339 |
| 2,237,069 | 4/1941 | Weindel | 30/162 X |
| 2,477,442 | 7/1949 | Cramer, Jr. et al. | 56/25.4 |
| 2,617,166 | 11/1952 | Kaufmann | 403/353 X |
| 3,418,793 | 12/1968 | Brewer | 56/295 |
| 3,507,104 | 4/1970 | Kline et al. | 56/295 |
| 3,877,146 | 4/1975 | Pittinger | 56/295 |
| 4,171,608 | 10/1979 | Hetrick | 56/295 |
| 4,389,776 | 6/1983 | Okada | 30/162 |

Primary Examiner—Douglas D. Watts
Attorney, Agent, or Firm—J. Lanny Tucker

[57] ABSTRACT

A holder for releasably securing an elongated bar, e.g. a cutting blade, to a drive-means comprises: (a) a holder body adapted to be connected to the drive means and having a substantially flat outer face for guiding and holding the bar; (b) an engaging means biased outwardly from the flat outer face to engage a hole in the bar; and (c) a wall spaced apart from and opposing the flat outer face and connected thereto by a spacing means to form a guiding recess for the bar formed along a longitudinal side edge of the flat outer face and having openings at both longitudinal ends of that face. An elongated cutting blade can be adapted to fit in this holder and the blade-holder combination is especially useful on rotary lawn mowers. The blade is quickly and easily released from the holder for sharpening or replacement.

9 Claims, 7 Drawing Figures

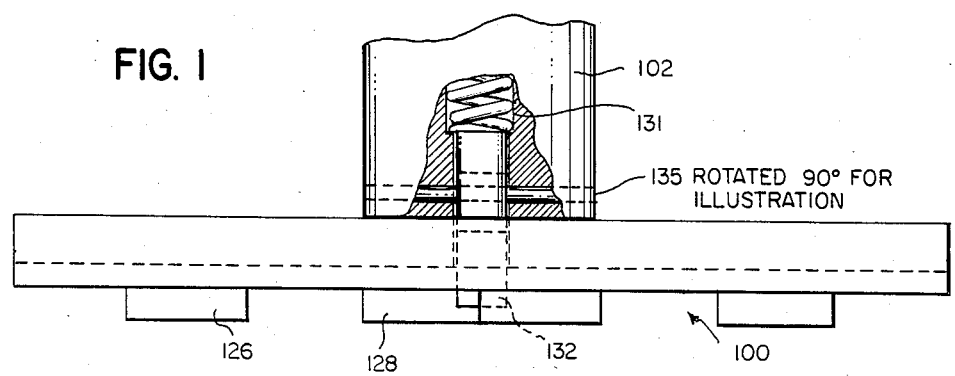
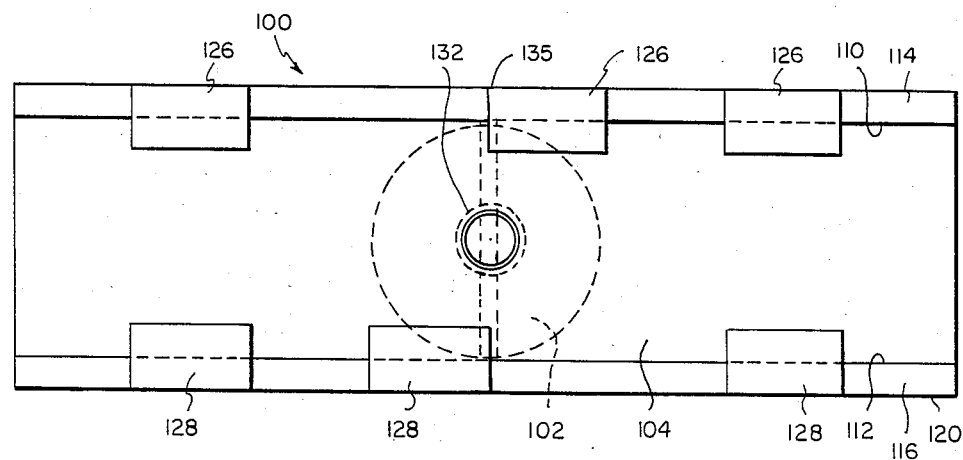
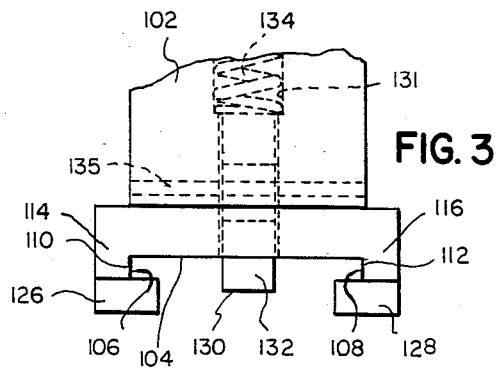
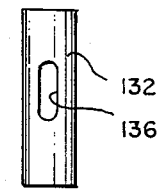

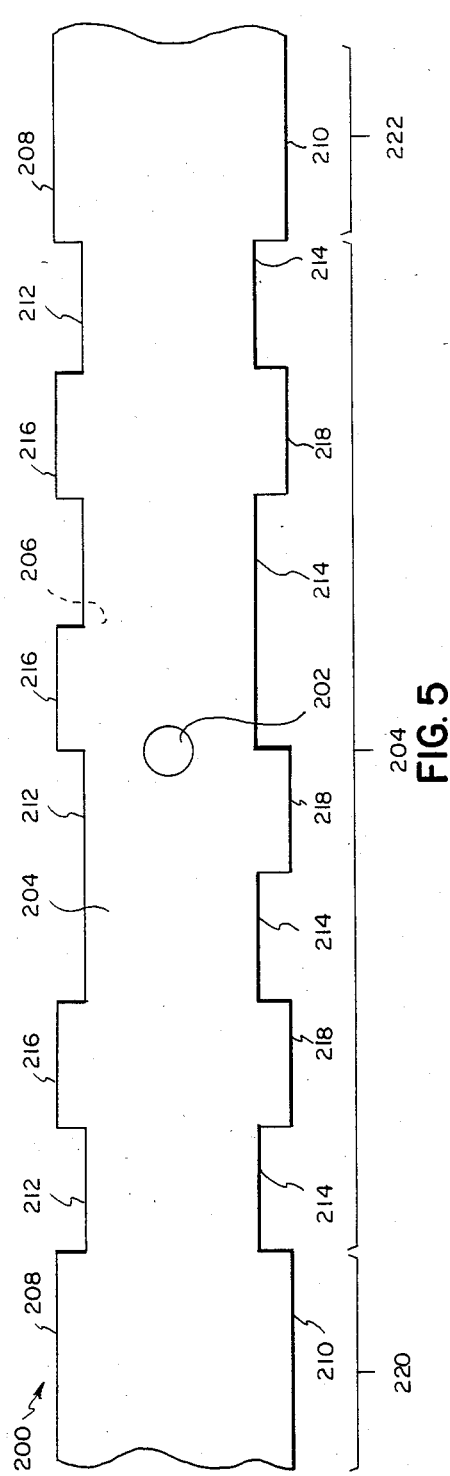
FIG. 5
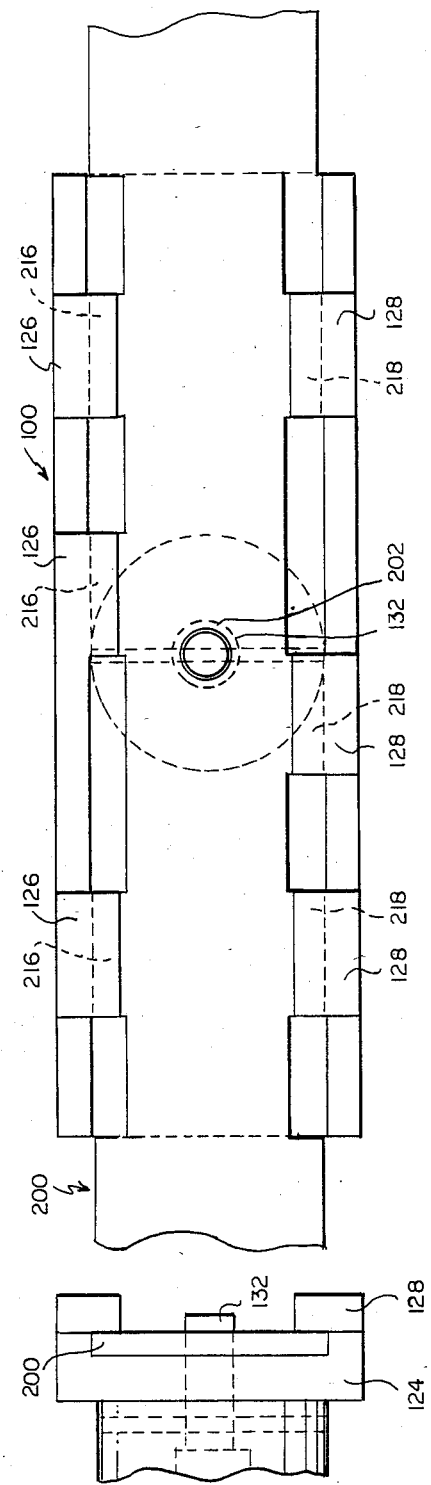
FIG. 6
FIG. 7

RELEASABLE BLADE, BLADE HOLDER AND BLADE-HOLDER COMBINATION

FIELD OF THE INVENTION

This invention relates to articles of manufacture which can be used in various apparatus, such as an apparatus having rotary drive means. In particular, it relates to an elongated bar and a holder for such bar which are particularly useful in rotary lawn mowers.

BACKGROUND OF THE INVENTION

Rotary lawn mowers have become standard equipment for homeowners who wish to trim and maintain their lawns. Such mowers typically have an internal combustion engine mounted on an engine shroud or housing. The engine turns a rotatable metal cutting blade underneath the engine shroud. The sharpened edges of such blades become dull rather quickly and it becomes necessary to frequently replace or sharpen the blade.

Sharpening the blade edges while the blade is attached to the mower is a difficult and hazardous task, as is well known by anyone who has tried it. For example, it is difficult to keep the blade from turning on its axis while trying to sharpen the edges. Further, the rotating blade can easily spin and injure a hand or foot during the process.

Hence, it is preferable to remove the blade from the mower for sharpening. But this task can be difficult and hazardous too. Generally, conventional cutting blades are attached to the rotary drive means of the mower with one or more metal bolts. These bolts tend to corrode and to become encrusted with dirt, grease and dried grass clippings after considerable use, and removing these bolts can be very difficult and time consuming. Such removal can also be hazardous because when attempting to loosen the bolts, the blade tends to rotate and care must be taken to avoid injury to a hand or foot. Once the blade has been removed and sharpened, however, reattachment has the same problems.

Quick-release or detachable blades have been the goal of innovators in this art for some time. For example, U.S. Pat. No. 3,877,146 (issued Apr. 15, 1975 to Pittinger) relates to a plastic holder for blades in rotary grass trimmers, fans or similar apparatus. The holder is designed to releasably hold the blade with elastically deformable retaining portions or plastic fingers. Although this plastic holder may be suitable for small rotary grass trimmers or fans, it would not be useful in heavy-duty cutting equipment, such as rotary lawn mowers. The plastic blade is held in the holder merely by two deformable plastic fingers which would very likely be deformed and release the blade if it struck a rock or other hard object during use. If the blade was prematurely released or broken, the flying parts would be highly dangerous to the user or bystanders. Hence, this plastic apparatus has limited utility and safety features.

Therefore, it would be desirable to have a holder for securely retaining a cutting blade, but from which holder the blade can be easily and safely released for sharpening or replacement.

SUMMARY OF THE INVENTION

The present invention provides a novel holder and bar-holder combination which securely and releasably holds an elongated bar, such as a mower cutting blade. The articles of manufacture of this invention overcome the problems inherent with conventional cutting blades and blade holders noted hereinabove.

In particular, my holder safely secures the cutting blade during use, but the blade can be easily and quickly released from and reattached to it without the use of tools, even after months of continuous use. The frustration and danger normally associated with removing blades from lawn mowers is thereby greatly reduced. Hence, the blade can be easily sharpened frequently during the lawn cutting season with minimal effort. Further, in a preferred embodiment of this invention, the blade and holder are designed such that the blade cannot be attached to the holder upside down.

These advantages are achieved by my blade holder which has an engaging pin biased with a compression spring outwardly from the holder face against which the blade rests. This engaging pin projects through a hole in the blade, but can be easily pushed in to release the blade which is easily slid out of the holder. The blade and holder also have notches and tabs which can be lined up to safely secure the blade in the holder during use.

My invention can be used in a variety of apparatus, including rotary lawn mowers, rotary grass trimmers, fans, aircraft and windmill propellers, meat grinders, food processors and the like.

In accordance with this invention, an elongated bar comprises:

(a) upper and lower surfaces terminating at opposite ends;

(b) a hole through those surfaces in an attachment portion of the bar, and (c) longitudinal opposite edges along the surfaces, each of the edges having in the bar attachment portion, two or more notches extending inwardly from the edges and providing one or more tabs on each of the edges.

This invention also provides a holder for releasably securing an elongated bar to a drive means. This holder comprises:

(a) a holder body adapted to be connected to the drive means and having a substantially flat outer face;

(b) an engaging means biased outwardly from the flat outer face to engage a hole in the bar; and (c) a wall spaced apart from and opposing the flat outer face and connected thereto by a spacing means to form a guiding recess for the bar formed along a longitudinal side edge of the flat outer face and having openings at both longitudinal ends of the flat outer face.

In a preferred embodiment, the guiding recess of the holder is formed by the flat outer face, a peripheral wall projecting outwardly from the flat outer face at a longitudinal side thereof and at a right angle thereto, and a lip protruding inwardly from the peripheral wall at a right angle thereto and substantially parallel to the flat outer face. More preferably, a peripheral wall projects outwardly from each of the longitudinal sides and a lip protrudes inwardly from each wall.

Still further, this invention provides a combination of an elongated bar and a bar holder. This combination comprises:

an elongated bar having upper and lower surfaces terminating at opposite ends, a central hole through the surfaces in an attachment portion of the bar, and longitudinal opposite edges along the surfaces; and the holder as described above releasably securing the elongated bar to a rotational drive means.

BRIEF DESCRIPTION OF THE DRAWINGS

FIG. 1 is a fragmentary longitudinal side view of the holder of the present invention partially cut away.

FIG. 2 is a bottom plan view of the holder of this invention shown in FIG. 1.

FIG. 3 is a fragmentary plan end view of the holder of this invention shown in FIG. 1.

FIG. 4 is a side view of an engaging pin used in the holder of this invention and illustrated in FIGS. 2 and 3.

FIG. 5 is a fragmentary topside view of the cutting blade of the present invention.

FIG. 6 is a fragmentary bottom plan view of the blade-holder combination of this invention with the blade secured in the holder.

FIG. 7 is a fragmentary plan end view of the blade-holder combination shown in FIG. 6.

DETAILED DESCRIPTION OF THE INVENTION

Referring now to the drawings, a preferred embodiment of this invention is embodied in a holder, indicated generally by the reference numeral 100, for securely and releasably holding an elongated cutting blade 200. This blade-holder combination can be connected to a rotational drive means, e.g. a shaft in a rotary lawn mower where the entire assembly is rotated. Although holder 100 and blade 200 are described herein in terms relating to a lawn mower, it will be readily appreciated that the invention is equally well suited for use in fans, meat grinders, food processors or as propeller assemblies and the like.

Holder 100 illustrated in FIGS. 1–3 can have any suitable dimensions so as to securely hold an elongated bar of desired width and thickness. It can be made of plastic or metal, but it is preferably made with hardened steel for increased durability and safety.

My holder 100 comprises a holder body 102 which is adapted to be connected to a rotational shaft in a suitable manner. Generally, holder body 102 is a round shaft which is connected to the mower rotational drive means. Holder body 102 has a substantially flat outer face 104 against which the cutting blade is secured in a flat plane. Two guide grooves 106 and 108 are formed along the longitudinal side edges 110 and 112, respectively, of flat outer face 104. Grooves 106 and 108 are formed with opposing peripheral walls 114 and 116, respectively, which project outwardly from flat outer face 104 at respective side edges 110 and 112 and at right angles thereto; and lip tabs 126 and 128 protruding inwardly from respective peripheral walls 114 and 116 at a right angle thereto and substantially parallel to flat outer face 104. Lip tabs 126 and 128 are interspaced along the length of walls 114 and 116 providing one or more lip notches along the walls, respectively.

FIG. 3 shows the central engaging means 130 which is biased, or forced, outwardly from holder cavity 131 through flat outer face 104 to engage a central hole in the blade (see FIG. 5). Engaging means 130 includes an engaging pin 132 (see FIG. 4) which engages the central hole in the blade, a compression spring 134 which forces or biases engaging pin 132 outward from flat outer face 104. Engaging pin 132 is retained in the holder cavity 131 and in holder body 102 with a retaining pin (not shown) which is passed through a retaining hole 135 in holder body 102 and engaging pin slot 136 (see FIG. 4). The engaging pin, compression spring and retaining pin of the engaging means can be composed of any suitable material known to one skilled in the art, but they are typically metallic. For example, the engaging pin can be composed of tool steel or heat-treated or an equivalent hardened steel. The compression spring can be made of spring steel, and the retaining pin can be composed of mild steel. They can be designed to have suitable dimensions. Typically, the engaging pin is slightly smaller in diameter than the holder cavity and the central hole of the cutting blade so as to provide a snug but not overly tight fit.

In FIG. 5, cutting blade 200 is illustrated in a fragmentary topside view. Blade 200 is engaged by its center hole 202 by the holder described above. Center hole 202 is typically circular and is located in attachment portion 204. Center hole 202 passes through upper and lower surfaces 204 and 206 which terminate at opposite ends (not shown). Along surfaces 204 and 206 are longitudinal opposite edges 208 and 210. Each of edges 208 and 210 has, in attachment portion 204, two or more notches denoted by numerals 212 and 214, respectively, extending inwardly from edges 208 and 210 and providing one or more tabs denoted by numerals 216 and 218 on each of edges 208 and 210, respectively. Illustrated only partially, sharpened portions 220 and 222 extend oppositely from attachment portion 204 toward the opposite ends (not shown). The edges 208 and 210 can have one or more sharpened regions each in the respective sharpened portions 220 and 222. In other words, one edge is sharpened at one end of the blade while the opposite edge is sharpened at the other end of the blade.

FIGS. 6 and 7 show the combination of this invention comprising cutting blade 200 in an engaged position in holder 100. Blade 200 is held in holder 100 by engaging pin 132 which engages center hole 202 of the blade and tabs 216 and 218 which are under lip tabs 126 and 128, respectively. Blade 200 can be easily removed from the holder 100 by simply pressing engaging pin 132 inward against the compression spring (not shown) and sliding the blade a short distance until tabs 216 and 218 are between lip tabs 126 and 128, respectively, whereupon the blade can be easily lifted away from the holder. Reattachment of the blade to the holder is simply done by performing the recited steps in reverse.

The present invention is especially advantageous for use on rotary mowers of any type, riding, self-propelled, mulching, etc.

Although the present invention has been fully described by way of example with reference to the accompanying drawings, it is to be noted that various changes and modifications will be apparent to those skilled in the art. Tnerefore, unless such changes and modifications depart from the scope of this invention, they should be construed as included therein.

I claim:

1. An elongated cutting blade comprising:
   (a) upper and lower surfaces terminating at opposite ends;
   (b) a hole through said surface in the center of an attachment portion of said blade about which said cutting blade is balanced for rotation; and
   (c) longitudinal opposite edges along said surfaces, each of said edges having in said blade attachment portion, two or more notches extending inwardly from said edges and providing one or more tabs on each of said edges, and on each of said longitudinal opposite edges, a sharpened portion extending oppositely from said blade attachment portion toward said opposite ends.

2. The blade of claim 1 wherein said hole is circular.

3. The blade of claim 1 having four notches in each of said longitudinal opposite edges, providing three tabs on each of said edges.

4. A holder for releasably securing an elongated bar to a drive means, said holder comprising:
   (a) a holder body adapted to be connected to said drive means and having a substantially flat outer face;
   (b) an engaging means biased outwardly from said flat outer face to engage a hole in said bar; and
   (c) two guide grooves formed along the longitudinal side edges of said flat outer face with opposing peripheral walls projecting outwardly from said flat outer face at the respective longitudinal sides thereof and at right angles thereto, and two or more lip tabs protruding inwardly from each of said peripheral walls at a right angle thereto and substantially parallel to said flat outer face,
   said lip tabs being interspaced along the length of said walls providing one or more lip notches along said walls.

5. The holder of claim 4 wherein said engaging means comprises an engaging pin and a compression spring.

6. A holder for releasably securing a cutting blade to a rotational drive means, said holder comprising:
   (a) a holder body adapted to be connected to said rotational drive means and having a substantially flat outer face;
   (b) a central engaging means biased outwardly from said flat outer face to engage a central hole in said cutting blade, said engaging means comprising an engaging pin to engage said central hole, a compression spring forcing said engaging pin outwardly from said flat outer face and a retaining pin for holding said engaging pin within said holder body; and
   (c) two guide grooves formed along the longitudinal side edges of said flat outer face with opposing peripheral walls projecting outwardly from said flat outer face at the respective longitudinal sides thereof and at right angles thereto, and two or more lip tabs protruding inwardly from each of said peripheral walls at a right angle thereto and substantially parallel to said flat outer face,
   said lip tabs being interspaced along the length of said walls providing one or more lip notches along said walls.

7. The holder of claim 6 adapted for a rotary lawn mower.

8. A combination of an elongated cutting bar and a bar holder, said combination comprising:
   an elongated cutting bar having upper and lower surfaces terminating at opposite ends, a central hole through said surfaces in an attachment portion of said bar, and longitudinal opposite edges along said surfaces, each of said edges having in said bar attachment portion, two or more notches extending inwardly from said edges and providing one or more tabs on each of said edges, and on each of said longitudinal opposite edges, a sharpened portion extending oppositely from said bar attachment portion toward said opposite ends; and
   a holder releasably securing said elongated bar to a rotational drive means, said holder comprising:
   (a) a holder body adapted to be connected to said rotational drive means and having a substantially flat outer face;
   (b) a central engaging means biased outwardly from said outer face and engaging said central hole in said bar; and
   (c) two guide grooves formed along the longitudinal side edges of said flat outer face with opposing peripheral walls projecting outwardly from said flat outer face at the respective longitudinal sides thereof and at right angles thereto, and two or more lip tabs protruding inwardly from each of said peripheral walls at a right angle thereto and substantially parallel to said flat outer face,
   said lip tabs being interspaced along the length of said walls providing one or more lip notches along said walls.

9. A combination of a cutting blade and a blade holder, said combination comprising:
   (1) an elongated cutting blade comprising:
      (a) upper and lower surfaces terminating at opposite ends,
      (b) a central hole through said surfaces in an attachment portion of said blade; and
      (c) longitudinal opposite edges along said surfaces, each of said edges having in said blade attachment portion, two or more notches extending inwardly from said edges and providing one or more tabs on each of said edges, and a sharpened portion extending oppositely from said blade attachment portion toward said opposite ends; and
   (2) a holder releasably securing said elongated cutting blade to a rotational drive means, said holder comprising:
      (a) a holder body adapted to be connected to said rotational drive means and having a substantially flat outer face;
      (b) a central engaging means biased outwardly from said flat outer face and engaging said central hole in said bar; said engaging means comprising an engaging pin to engage said central hole, a compression spring forcing said engaging pin outwardly from said flat outer face and a retaining pin for holding said engaging pin within said holder body; and
      (c) two guide grooves formed along the longitudinal side edges of said flat outer face with opposing peripheral walls projecting outwardly from said flat outer face at the respective longitudinal sides thereof and at right angles thereto, and two or more lip tabs protruding inwardly from each of said peripheral walls at a right angle thereto and substantially parallel to said flat outer face,
   said lip tabs being interspaced along the length of said walls providing one or more lip notches along said walls.

* * * * *